United States Patent

Ukai et al.

[11] 3,924,171
[45] Dec. 2, 1975

[54] SERVO MOTOR CONTROL CIRCUIT

[75] Inventors: Takeshi Ukai, Tokyo; Masao Yaeshima, Sendai; Kimio Watanabe, Iwanuma, all of Japan

[73] Assignee: Ricoh Co., Ltd., Tokyo, Japan

[22] Filed: Sept. 7, 1973

[21] Appl. No.: 395,175

[30] Foreign Application Priority Data
Sept. 13, 1972 Japan.............................. 47-92056

[52] U.S. Cl. ................ 318/663; 318/678; 318/681
[51] Int. Cl.² ........................ G05B 1/06; G05F 1/00
[58] Field of Search..................... 318/663, 678, 681

[56] References Cited
UNITED STATES PATENTS

| | | | |
|---|---|---|---|
| 3,571,688 | 3/1971 | Tomasulo, Jr. ................ | 318/681 X |
| 3,731,173 | 5/1973 | Pinckaers....................... | 318/663 X |
| 3,789,283 | 1/1974 | Kabat............................ | 318/663 X |

Primary Examiner—T. E. Lynch
Attorney, Agent, or Firm—Cooper, Dunham, Clark, Griffin & Moran

[57] ABSTRACT

A control circuit for controlling the rotation of a servo motor comprises a high gain differential amplifier for producing an output corresponding to the difference between a voltage output from a first potentiometer which moves with the servo motor and a voltage output from a second potentiometer which provides a setting for the angle of rotation of the servo motor. The control circuit further includes a high sensitivity switching circuit including programmable unijunction transistors for detecting the output from the differential amplifier to effect rotation of the servo motor in a forward or reverse direction.

4 Claims, 1 Drawing Figure

U.S. Patent  Dec. 2, 1975  3,924,171
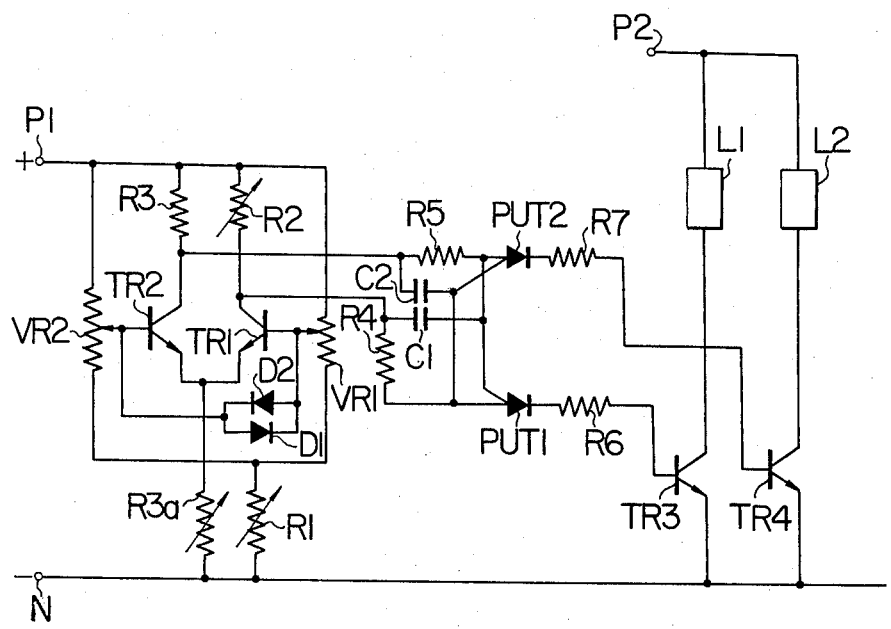

SERVO MOTOR CONTROL CIRCUIT

BACKGROUND OF THE INVENTION

The invention relates to a servo motor control circuit for controlling a servo motor as used in the drive for the magnification controlling lens system of a plate making machine.

The usual practice to operate a servo motor by means of potentiometers involves the use of a first potentiometer which moves with the servo motor and a second potentiometer which provides a setting for the angle of rotation of the servo motor. The difference in the outputs from the both potentiometers is amplified by a differential amplifier before activating a switching circuit with such output to cause rotation of the servo motor in a direction to produce a balance between the potentials from the both potentiometers.

In a control circuit thus constructed, the amplifying gain of the differential amplifier is fixed, which prevents regulation of the accuracy with which the servo motor is controlled. However, in order to drive a servo motor for a magnification controlling lens system, a highly sensitive movement is demanded of the motor.

In order to satisfy such need, the differential amplifier must have a high gain which is adjustable, and a switching circuit which is responsive to an extremely small differential output must be used.

SUMMARY OF THE INVENTION

It is an object of the invention to provide a servo motor control circuit in which the first and second potentiometers are connected in a bridge configuration, the output of which is amplified by a differential amplifier having a high adjustable gain and is then detected by a high sensitivity switching circuit including programmable unijunction transistors (PUT).

In accordance with the invention, a signal dependent upon the difference between the voltage outputs from a potentiometer which moves with the servo motor and another potentiometer which provides a setting for the angle of rotation of the servo motor is derived by an amplifier having an adjustable high gain, and activates a high sensitivity switching circuit to drive the servo motor, thus providing a servo motor control circuit which exhibits a stable operation over the entire control range even though the detection current may be extremely small and which allows the accuracy with which the servo motor is controlled to be adjusted at will by a variable resistor which varies the gain of the amplifier.

BRIEF DESCRIPTION OF DRAWING

The single drawing is an electrical circuit diagram showing one embodiment of the servo motor control circuit according to the invention.

DETAILED DESCRIPTION OF A PREFERRED EMBODIMENT OF THE INVENTION

A first potentiometer VR1 which moves with the servo motor and a second potentiometer VR2 which provides a setting for the angle of rotation of the servo motor are connected together at their one end and connected through a common variable resistor R1 to a negative d.c. supply terminal N, and are connected at their other end with a positive d.c. supply terminal P1. These potentiometers VR1 and VR2 form a bridge circuit.

The sliders on the potentiometers VR1 and VR2 are connected with the base of NPN transistors TR1 and TR2, respectively, and these sliders are connected together through an anti-parallel connection of diodes D1 and D2. The transistors TR1 and TR2 form a high gain differential amplifier, and their emitters are connected together and connected through a common variable resistor R3a with the supply terminal N, while the collectors are connected with the supply terminal P1 through a variable resistor R2 and a fixed resistor R3, respectively.

The output of the high gain differential amplifier thus constructed is applied to a high sensitivity switching circuit including programmable unijunction transistors. Specifically, the collector of the transistor TR1 is connected through a resistor R4 with the anode of a programmable unijunction transistor PUT1 and is also connected through a capacitor C1 with the gate of the programmable unijunction transistor PUT1 as well as the anode of another programmable unijunction transistor PUT2. The collector of the transistor TR2 is connected through a resistor R5 with the anode of the programmable unijunction transistor PUT2, and is also connected through a capacitor C2 with the gate of the programmable unijunction transistor PUT2 as well the anode of the programmable unijunction transistor PUT1. As is well known, the gate voltage of these programmable unijunction transistors can be freely established by variation of an external resistor, and the cathode of these unijunction transistors are connected with the base of NPN transistors TR3 and TR4 through resistors R6 and R7, respectively. The transistors TR3 and TR4 have their emitters connected with the supply terminal N and their collectors connected with the positive d.c. supply terminal P2 through loads L1 and L2, respectively. In this manner, the transistors PUT1, PUT2, TR3 and TR4 form a high sensitivity switching circuit. The loads L1 and L2 form a respective circuit for causing rotation of the servo motor in a forward or reverse direction, respectively, and may comprise a relay, thyristor, triac or the like, for example.

In the servo motor control circuit described above, a desired angle of rotation for the servo motor is established by the potentiometer VR2. The voltage outputs from the sliders on the potentiometers VR1 and VR2 are applied to the base of the transistors TR1 and TR2, respectively, and the difference voltage therebetween is amplified and derived from the collector of these transistors. Thus, the voltage output from the potentiometer VR1 which corresponds to the current angle of rotation of the servo motor and the voltage output from the potentiometer VR2 which corresponds to the established angle of rotation for the servo motor are compared and amplified by the differential amplifier incorporating the transistors TR1 and TR2, and the output signal across the collectors of the transistors TR1 and TR2 will be positive or negative depending on whether the current angle of rotation of the servo motor is less or greater than the established angle. Such output signal is applied across the anode and gate of the programmable unijunction transistors PUT1 and PUT2 to cause either one of these unijunction transistors to turn on depending on the polarity of the output signal, thereby allowing the collector voltage of the transistor TR1 or TR2 to be applied to the base of the transistor TR3 or TR4 through the programmable unijunction transistor PUT1 or PUT2 whichever then conducts. In response to such base input, one of the transistor TR3 or TR4 is turned on, whereby the load associated with the conductive transistor is driven to cause rotation of the servo motor in either forward or reverse direction. The slider on the potentiometer VR1 moves with the servo motor, and when the prevailing angle of rotation of the servo motor becomes coincident with the established angle of rotation, the bridge circuit including the potentiometers VR1 and VR2 reaches a balanced condition. Thereupon, the output from the differential amplifier incorporating the transistors TR1 and TR2 will be null, turning off the programmable unijunction transistor PUT1 or PUT2 and further turning off the transistor TR3 or TR4 to stop the servo motor.

The insensitive range of the transistors TR3 and TR4 can be regulated by varying the value of the variable resistor R3a which results in a variation in the gain of the high gain differential amplifier as a result of the changing emitter potential of the transistors TR1 and TR2. In this manner, the accuracy with which the servo motor is controlled can be adjusted. The gain of the differential amplifier can also be varied by changing the value of the variable resistors R1 and R2. Because of the high gain of the differential amplifier incorporating the transistors TR1 and TR2, a stable operation is provided over the entire control range or over the full range of the potentiometer VR2 even though the detection current from the bridge circuit including potentiometers VR1 and VR2 may be extremely small.

What is claimed is:

1. A servo motor control circuit comprising a bridge circuit including a first potentiometer having a slider which moves with a servo motor and a second potentiometer having a slider settable to select an angle of roatation of the servo motor, said first and second potentiometers being connected in parallel, a D.C. power supply having two terminals connected across the parallel combination of the potentiometers, means connected to said sliders for providing a pair of outputs representing together the difference between the voltage levels at the sliders, and a high sensitivity switching circuit including a pair of programmable unijunction transistors each having its anode and gate connected to one and the other of said outputs, respectively, in symmetrical relation with each other, said switching circuit causing rotation of the servo motor in a selected one of a forward and a reverse direction depending on the firing of selected one of the pair of programmable unijunction transistors, wherein said high sensitivity switching circuit further includes capacitor means for moderating oversensitivity thereof.

2. A servo motor control circuit comprising a bridge circuit including a first potentiometer having a slider which moves with a servo motor and a second potentiometer having a slider settable to select an angle of rotation of the servo motor, said first and second potentiometers being connected in parallel, a D.C. power supply having two terminals connected across the parallel combination of the potentiometers, means connected to said sliders for providing a pair of outputs representing together the difference between the voltage levels at the sliders, and a high sensitivity switching circuit including a pair of programmable unijunction transistors each having its anode and gate connected to one and the other of said outputs, respectively, in symmetrical relation with each other, said switching circuit causing rotation of the servo motor in a selected one of a forward and a reverse direction depending on the firing of selected one of the pair of programmable unijunction transistors, wherein said means for providing the pair of outputs comprise a high gain differential amplifier comprising a first transistor having a base connected to the slider of the first potentiometer and a second transistor having a base connected to the slider of the second potentiometer, each transistor having a collector and an emitter.

3. A servo motor control circuit as in claim 2 further comprising a first variable resistor connected in series with the combination of the potentiometers, a second and a third resistor connecting the collectors of the first and second transistor respectively to one terminal of the power supply, at least one of said second and third resistor being a variable resistor, and a fourth variable resistor connecting the emitter of each last mentioned transistor to the other terminal of the power supply, said variable resistors being settable to control the sensitivity and the operating range of the differential amplifier and control circuit.

4. A servo motor control circuit comprising a bridge circuit including a first potentiometer having a slider which moves with a servo motor and a second potentiometer having a slider settable to select an angle of rotation of the servo motor, said first and second potentiometers being connected in parallel, a first variable resistor connected in series with the parallel combination of the potentiometers, a D.C. power supply having two terminals connected across said series combination of the potentiometers and the first variable resistor, a high gain differential amplifier comprising a first transistor having a base connected to the slider of the first potentiometer and a second transistor having a base connected to the slider of the second potentiometer, each transistor having a collector and an emitter, a second and a third resistor connecting the collectors of the first and second transistor respectively to one terminal of the power supply, at least one of said second and third resistor being a variable resistor, a fourth variable resistor connecting the emitter of each transistor to the other terminal of the power supply, and a high sensitivity switching circuit including programmable unijunction transistors for detecting the output from the high gain amplifier, said output being the difference between the voltage levels at the collectors of the two transistors comprising the differential amplifier, said switching circuit causing rotation of the servo motor in a selected one of a forward and a reverse direction depending on the sense and magnitude of said output of the differential amplifier, said variable resistors being settable to control both the sensitivity and the operating range of the differential amplifier and control circuit.

* * * * *